United States Patent
Fabel

[19]

[11] Patent Number: 5,556,223
[45] Date of Patent: Sep. 17, 1996

[54] COUPLING

[76] Inventor: Eugen Fabel, Buchfeldterrasse 2, 6033 Buchrain, Switzerland

[21] Appl. No.: 290,821
[22] PCT Filed: Dec. 17, 1993
[86] PCT No.: PCT/CH93/00288
    § 371 Date: Oct. 26, 1994
    § 102(e) Date: Oct. 26, 1994
[87] PCT Pub. No.: WO94/15110
    PCT Pub. Date: Jul. 7, 1994

[30] Foreign Application Priority Data

Dec. 18, 1992 [CH] Switzerland .................. 3858/92

[51] Int. Cl.⁶ .............. F16D 1/08; F16D 1/06; B23B 31/02
[52] U.S. Cl. ............ 403/362; 408/239 R; 279/83; 72/68
[58] Field of Search ............ 408/239 A, 239 R, 408/238; 279/83; 409/234; 72/68; 403/362

[56] References Cited

U.S. PATENT DOCUMENTS

| | | |
|---|---|---|
| 1,372,289 | 3/1921 | Hines . |
| 2,163,315 | 6/1939 | Dalrymple ............ 403/362 X |
| 3,022,084 | 2/1962 | Dresback . |
| 3,479,072 | 11/1969 | Kosar ............ 403/362 X |
| 3,790,296 | 2/1974 | Mottu et al. ............ 408/239 |
| 3,830,577 | 8/1974 | Rampe et al. . |
| 4,544,054 | 10/1985 | Brown . |
| 4,627,665 | 12/1986 | Ewing et al. ............ 72/68 X |
| 4,718,799 | 1/1988 | Hubscher ............ 408/239 R X |
| 4,813,831 | 3/1989 | Reinauer . |
| 4,877,360 | 10/1989 | Pfalzgraf ............ 408/239 R X |
| 4,913,607 | 4/1990 | von Haas ............ 279/83 X |

FOREIGN PATENT DOCUMENTS

| | | |
|---|---|---|
| 0088589 | 9/1983 | European Pat. Off. . |
| 0141451 | 5/1988 | European Pat. Off. . |
| 0281760 | 9/1988 | European Pat. Off. . |
| 656335 | 6/1986 | Switzerland . |

OTHER PUBLICATIONS

J. M. Camp et al., *The Making, Shaping And Treating Of Steel*, Chapter II, "Heat Treating Theory and Practice", pp. 670–704, Fourth Edition, copyright 1925.

Primary Examiner—Anthony Knight
Attorney, Agent, or Firm—Tarolli, Sundheim, Covell, Tummino & Szabo

[57] ABSTRACT

In a coupling with two sections (1, 12) which are prestressed by a tensioning device with at least one cylindrical tensioning component (16) in which one conical end tranverse to the coupling axis (11) of the tensioning component (16) acts on a tensioning surface (24) arranged obliquely to the coupling axis (11) and generates a tensile force acting in the direction of the coupling axis (11), an improvement in the mechanical behavior is attained in that the coupling sections (1, 12) are made of a case-hardened material, preferably steel, the tensioning surface (24) espouses the surface of the conical end of the tensioning component and the latter (24) is made by cold extrusion before hardening.

19 Claims, 3 Drawing Sheets

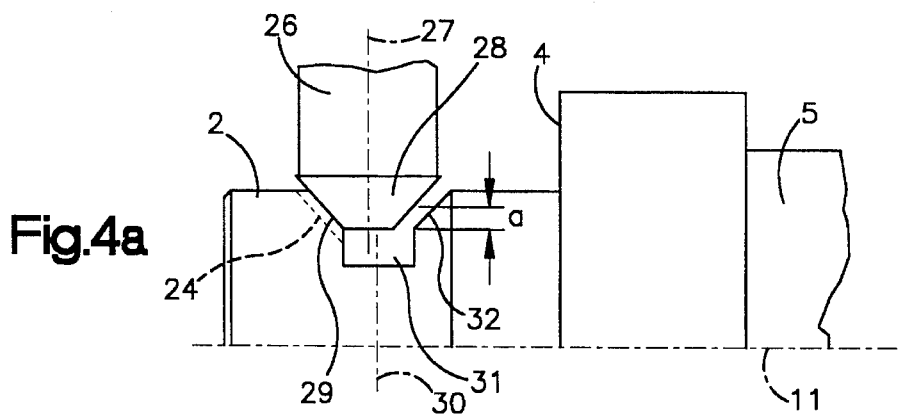
Fig.4a
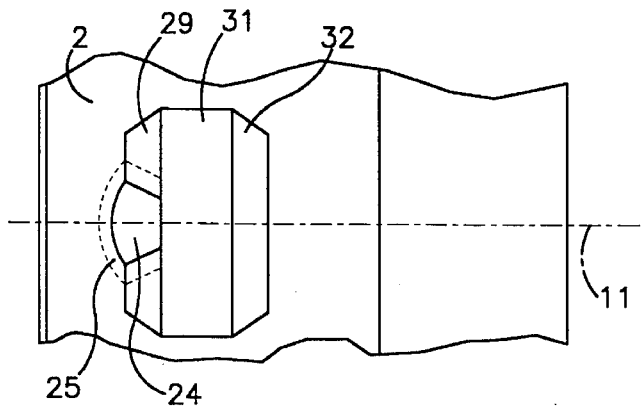
Fig.4b
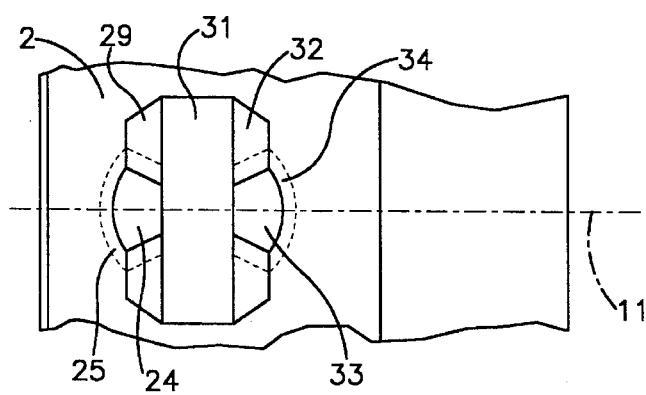
Fig.4c
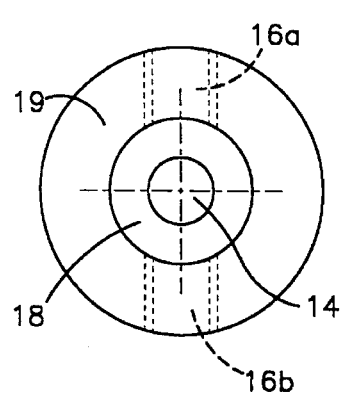 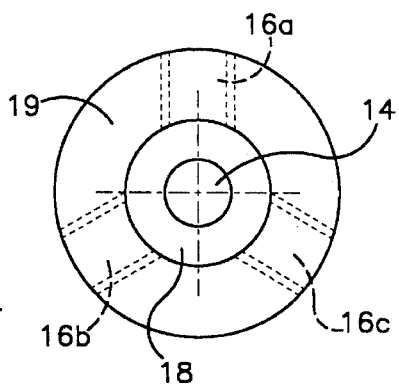
Fig.5a   Fig.5b   Fig.5c

COUPLING

TECHNICAL FIELD

The present invention relates to the field of the technology of detachable connections. It specifically relates to a coupling, particularly for joining a tool to a driving unit, comprising (a) two coupling parts successively arranged in a coupling axis and which have two facing contact surfaces at right angles to the coupling axis, (b) within the first coupling part a clamping trunnion projecting from the first contact surface and substantially rotationally symmetrical to the coupling axis, (c) within the second coupling part a reception bore for receiving the clamping trunnion and which emanates from the second contact surface and is located in the coupling axis in such a way that the two contact surfaces engage on one another when the clamping trunnion is completely inserted in the reception bore and (d) a clamping device with at least one cylindrical clamping element, which with a conically tapering end in the vicinity of the reception bore and transversely to the coupling axis acts through the reception body on a clamping surface on the clamping trunnion and inclined with respect to the coupling axis and produces a clamping force acting in the direction of the coupling axis.

Such a coupling is e.g. known from European Patent EP-B1-141,451 in the form of a tool reception or mounting device and a matching tool carrier.

PRIOR ART

Couplings for the transfer of static or dynamic forces are known from the prior art in numerous different forms and with different operating principles. In the case of couplings operating with clamping forces, a distinction can be fundamentally made between two large groups, namely one group in which the clamping forces act radially to the coupling axis and another group in which the clamping forces act in the axial direction.

In the second group the axial forces can e.g. be produced by simply screwing together the two coupling parts, which is often cumbersome and time-consuming. Alternatively a bracing effect can be achieved by the lateral introduction of forces directed at right angles to the coupling axis and which are then deflected in the axial direction (wedge action).

In the case of couplings based on the latter principle and which are frequently used as so-called high-speed couplings, for the deflection of the clamping forces use is generally made of a clamping element with a conically tapering end, which acts on a clamping surface sloping with respect to the coupling axis.

Thus, e.g. U.S. Pat. No. 3,022,084 discloses a high-speed coupling for the connection of a tool holder and tool mounting device, which has a first coupling part with a first contact surface and a cylindrical clamp bolt projecting from said contact surface, as well as a second coupling part with a second contact surface and a corresponding bore for the reception of the clamp bolt. The clamping element is constituted by a locking screw with a conical screw end, which can be screwed transversely to the coupling axis through an associated tapped hole in the wall of the reception bore and in axially displaced manner engages in a correspondingly shaped, conical bore in the clamp bolt. As a result of the axial displacement between the locking screw and the conical bore, a force only acts on the latter on one side, the inclined wall thereof acting as a clamping surface, so that there is a resultant clamping force in the direction of the coupling axis. This force presses the two contact surfaces against one another with the desired initial load and consequently brings about a force closure between the two coupling parts, which is suitable for the transfer of static and dynamic forces.

In addition, e.g. CH-A5-656,335 discloses a drilling tool, which has a coupling with comparable contact surfaces. The clamping device is in this case in the form of two facing locking screws (retaining screws) with conically shaped ends, which act from two sides on a connecting bolt also with conical ends displaceably mounted at right angles to the coupling axis in the interior of the clamp bolt. Here again an axial displacement between the axes of the locking screws and the axis of the connecting bolt on screwing in said screws ensures a clamping force in the direction of the coupling axis.

Both coupling types suffer from the disadvantage that the elements essential for the clamping device such as the conical bore or the sliding connecting bolt must be very accurately machined, which leads to a relatively high manufacturing cost and due to the high costs involved the uses of such couplings are greatly restricted. However, it is particularly disadvantageous that the repeated insertion of the locking screws on the clamping trunnions can lead to impressions in the clamping surface, which are due to a plastic deformation and not only reduce the attainable clamping forces, but also prevent a reproducible setting of clearly defined initial loads.

Another, somewhat simplified coupling is disclosed in the first-mentioned document and once again a locking screw is used. The clamping surface is constituted by a surface milled on the clamp bolt and which is laterally bounded by a side inclined by approximately 45°. Here again it is in particular impossible to guarantee a reproducible initial loading of the coupling parts due to the aforementioned plastic deformation occurring in use.

DESCRIPTION OF THE INVENTION

The problem of the invention is to so further develop a coupling of the aforementioned type that it can be easily manufactured and simultaneously permits an easy, reproducible setting of the initial load.

In the case of a coupling of the aforementioned type this problem is solved in that (e) at least the clamping trunnion is made from a surface-hardened material, preferably steel, (f) the clamping surface is geometrically true with respect to the surface of the conical clamping element and (g) the clamping surface is produced by cold extrusion prior to hardening.

The essence of the invention is that the clamping surface is produced in geometrically true manner by cold extrusion prior to the hardening of the coupling part by means of the clamping element or by means of another, comparable element with similarly shaped conical end. As a result of the cold extrusion and associated plastic deformation a homogeneous workhardening zone is produced below the impression or indentation and this locally increases the breaking and compressive strength or the hardness and wear resistance of the material.

On the one hand this ensures that without any further reworking stages the clamping surface is adapted in optimum manner to the conical end of the clamping element and the contact and therefore force transfer surface between the clamping element and the clamping surface is enlarged. On the other hand the workhardening zone below the impression ensures that during operation working takes place in the elastic range and no further plastic deformations occur, so that high initial loads can be reproducibly produced with short clamping paths.

A first preferred embodiment of the coupling according to the invention is characterized in that (a) the clamping trunnion is provided with an all-round clamping groove, which on the side further removed from the first contact surface is laterally bounded by a first, inclined groove side and (b) the clamping surface is located on the first groove side. This embodiment has the advantage that the all-round groove can be formed by turning in the same operation used for producing the turned part, which obviates the need for a disadvantageous and costly resetting of the workpiece.

A second, preferred embodiment of the invention is characterized in that (a) the clamping path to be covered by the clamping element during clamping is limited by a stop, (b) the clamping trunnion is provided with an all-round clamping groove, which is laterally bounded by two sloping groove sides, (c) the clamping surface is located on the first groove side further removed from the first contact surface and (d) the second groove side serves as a stop for the clamping element.

As a result of the stop it is effectively ensured that the non-symmetrical bracing in the coupling resulting from one-sided clamping without any torque-limiting tool does not become so large that the concentricity suffers, whilst also avoiding that the clamping element is loaded beyond its limits.

The coupling according to the invention has a particularly simple construction if, according to another embodiment, the clamping element is constituted by a locking screw with a hexagonal recess which, due to the lever action, permits high initial loads to be produced with a simple hexagon socket wrench.

Coupling assembly is also greatly facilitated if, according to another preferred embodiment of the coupling, for the at least one clamping element is provided a plurality of similar clamping surfaces arranged in rotationally symmetrical manner around the coupling axis and means are provided for positioning the coupling parts relative to one another in such a way that selectively one of the clamping surfaces faces the clamping element in the position appropriate for clamping. This makes it possible to assemble the coupling virtually blind and in different positions, without the user having to specifically respect the correct association of clamping surface and clamping element.

Further embodiments can be gathered from the dependent claims.

BRIEF DESCRIPTION OF THE DRAWINGS

The invention is described in greater detail hereinafter relative to embodiments and the attached drawings, wherein show:

FIG. 4 the details of an embodiment corresponding to FIG. 3 with a clamping slot and clamp bolt in side view (a) and in plan view with the clamping surface (b) and additional stop surface (c).

FIG. 5 a view similar to FIG. 2b showing an alternate embodiment (a), another alternate embodiment (b), and yet alternate embodiment (c).

WAYS FOR PERFORMING THE INVENTION

Figure 1A:
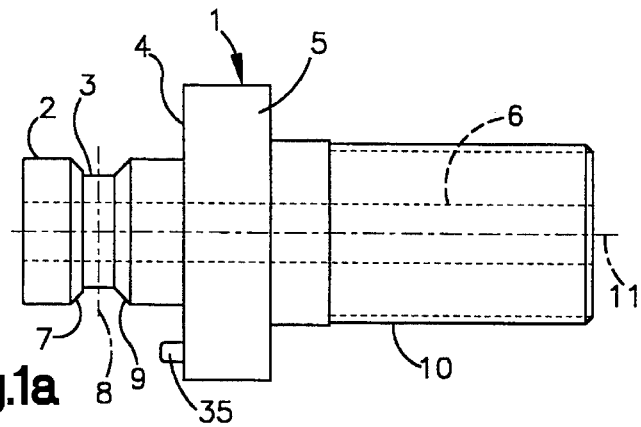
FIG. 1 a first, preferred embodiment for a first coupling part according to the invention with an all-round clamping groove in side view (a) and from the front (b).
Figure 1B:
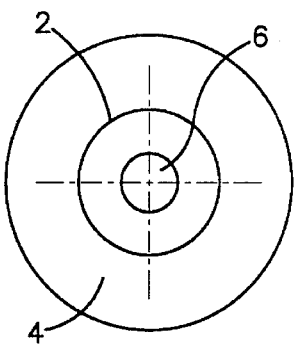

The coupling according to the invention fundamentally comprises two coupling parts, which are engaged in a coupling axis and are initially loaded in the axial direction by means of a clamping device. A preferred embodiment for the first of said coupling parts is shown in side view in FIG. 1a and in front view in FIG. 1b.

The first coupling part 1 comprises an e.g. cylindrical central part 5, which has on one side a first, planar contact surface 4 perpendicular to the coupling axis 11. From the first contact surface 4 projects a clamping trunnion 2, which is substantially rotationally symmetrical to the coupling axis 11 and in which is worked an all-round clamping groove 3. The clamping groove 3 is bounded on both sides of a middle plane 8 by groove sides 7 and 9, which are chamfered with an angle of approximately 45° with respect to the coupling axis. The first groove side 7 forms the clamping surface on which the clamping element acts.

On the other side of the central part 5 is provided a device for fixing a tool and which in the example of FIG. 1 comprises a threaded connection 10. Obviously random other devices could be used in place of the threaded connection 10. In addition, the central part 5 can be provided with chamfered faces, which permit the engagement of a wrench. The first coupling part 1 is also provided with an internal, axially parallel through bore 6, which can e.g. be used as a channel for the drilling fluid to be supplied to the tool.

Figure 2A:
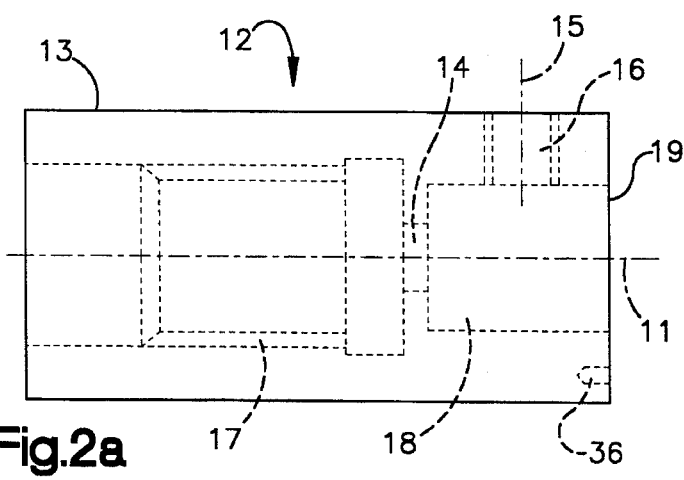
FIG. 2 the second coupling part corresponding to FIG. 1 in side view (a) and from the front (b).
Figure 2B:
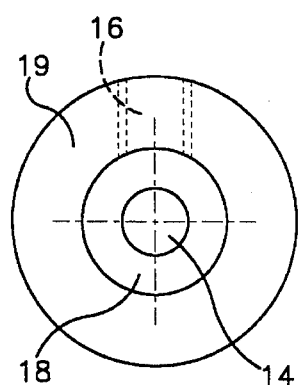

The second coupling part matching with the first coupling part of FIG. 1 is shown in side view in FIG. 2a and in front view in FIG. 2b. The second coupling part 12 essentially comprises a cylindrical reception body 13, which is bounded on one end face by a second and also planar contact surface 19 perpendicular to the coupling axis 11. From said second contact surface 19 is formed in the reception body 13 a reception bore 18 concentric to the coupling axis 11 and into which can be introduced with the desired fit the clamping trunnion 2 of the first coupling part 1.

The reception bore 18 is sufficiently deep that the clamping trunnion 2 is received in its full length. The two contact surfaces 4 and 19 are then directly in engagement with one another and can be initially loaded by means of a clamping device for introducing forces. The clamping device comprises a cylindrical clamping element 16 with a clamping element axis 15, which in the vicinity of the reception bore 18 acts transversely to the coupling axis 11 through the reception body and on the clamping surface (groove side 7) on the clamping trunnion 2. As the clamping element 16 has a conically tapering end (by approximately 45°, but not shown in FIG. 2), on inserting the clamping element 16 there is a clamping force deflected in the direction of the coupling axis, which presses together the two contact surfaces 4 and 19 and ensures the force transfer between the coupling parts 1 and 12.

For the connection of the second coupling part 12 to the tool reception device of a machine or the like in the example of FIG. 2 at the other end of the reception body 13 is provided an axial tapped bore 17 with the standard undercut and which is connected by a connecting bore 14 to the reception bore 18 for passing on any liquids. As in the case of the first coupling part 1, the tapped bore or hole 17 could obviously be replaced by other connecting devices.

Figure 3A:
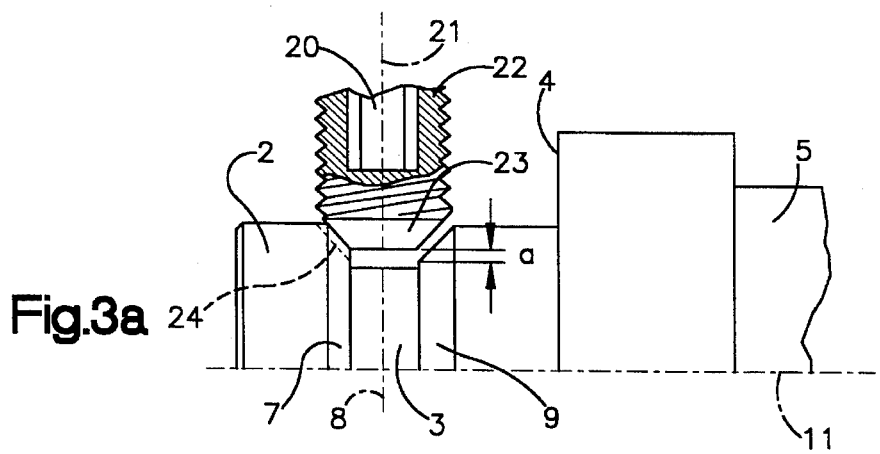
FIG. 3 details of the clamping groove of the coupling part according to FIG. 1 provided with the impression or indentation according to the invention and the cooperation with the clamping element (locking screw) in side view (a) and in plan view (b).

Whereas FIGS. 1 and 2 relate more to the overall arrangement of the coupling, FIGS. 3 and 4 give those details which are essential for the invention. FIG. 3a shows on a larger scale the clamping trunnion 2 with the clamping groove 3 of the FIG. 1 and which cooperates with the clamping element by means of the first groove side 7. For reasons of clarity the second coupling part 12 is not shown. In this example the clamping element is a locking screw 22 with a conical screw end 23 and a hexagonal recess 20. The screw axis 21 of the locking screw 22 is in the middle plane 8 of the locking groove 3.

On screwing in the locking screw 22 the conical screw end 23 initially only rests on the first groove side 7 and consequently produces a clamping force directed to the left in the drawing and which presses the first contact surface 4 against the not shown, second contact surface 19 of the second coupling part. This is achieved in the case of an identical distance from the groove sides 7,9 to the middle plane 8 in that the first groove side 7 is moved radially outwards relative to the second groove side 9.

The bearing area of the first groove side 7 is then increasingly elastically deformed on further insertion of the locking screw 22 until the screw end 23 rests on the second groove side 9 after covering a clamping path a. Therefore the second groove side 9 forms a stop, which makes the further insertion more difficult and consequently in simple manner reliably limits the clamping path and therefore the forces which occur. However, such a limitation of the clamping path is only possible because in the case of the coupling according to the invention special precautions are taken to largely exclude plastic deformations during the initial loading. For this purpose on the clamping trunnion 2, which is made from a surface-hardened material, preferably steel, is provided a special clamping surface 24 located in the first groove side 7 and which is shown in broken line form in FIG. 3a and in plan view in FIG. 3b. The shape of the clamping surface 24 is completely adapted to the conical screw end 23 (geometrically true). Prior to the hardening of the clamping trunnion it is introduced by cold extrusion in the first groove side 7. This can e.g. be brought about by inserting the locking screw 22 or by inserting a comparable, specially hardened screw or by inserting a correspondingly shaped bolt. So that during the subsequent use of the coupling the clamping surface 24 and the clamping element are always aligned, it is possible to use additional adjusting and setting aids, e.g. the pin 35 shown in exemplified manner in FIG. 1a, as well as the matching blind hole 36 in FIG. 2a.

Figure 3B:
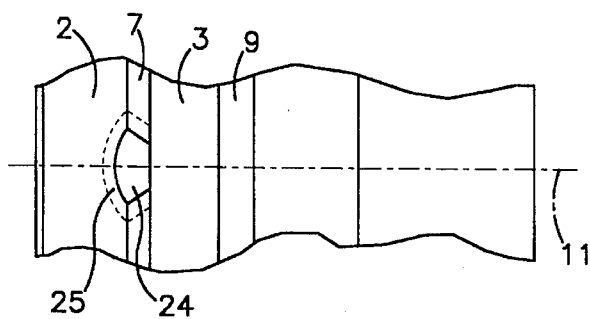

As a result of the cold extrusion the material layer located below the clamping surface 24 is plastically deformed and forms a very homogeneous workhardening zone 25 provided with particularly advantageous mechanical characteristics (FIG. 3b). The necessary dimensions for the clamping groove 3 and its sides 7,9, as well as the depth of the impression 24 and the length of the clamping path a result from the nature of the material used and the requirements made on the coupling.

The introduction of the clamping surface 24 has the following consequences:

- by the adaptation of the clamping surface to the conical shape of the screw end the force is introduced from the screw into the clamping trunnion over a larger surface, so that the compressive load in the surface and consequently the plastic deformation risk is reduced;
- the workhardening zone has an increased hardness and breaking strength, so that plastic deformations are largely avoided with the initial loads which occur and high initial loads can be produced over short clamping paths;
- as the workhardening is only limited to a relatively thin zone, the necessary toughness of the underlying material is completely retained.

Obviously the example of FIG. 3 is not the only possible design of the clamping side and clamping element. Other preferred constructions are shown in FIG. 4, the representations of FIGS. 3a and 4a, as well as 3b and 4b/4c correspond. In general, in the embodiment of FIG. 4 in place of the clamping groove there is a planar clamping slot 31 milled into the clamping trunnion and running transversely to the coupling axis 11 and which is bounded on both sides of the middle plane 30 by sloping slot sides 29,32. The clamping element is in this case a clamp bolt 26 with a bolt axis 27 and a conically tapering bolt end 28. It is obvious that within the scope of the invention the said clamp bolt can also be combined with the clamping groove 3 of FIG. 3 or the locking screw 22 of FIG. 3 can be combined with the clamping slot 31 of FIG. 4.

Like the locking screw of FIG. 3, the clamp bolt 26 presses with its conical bolt end on the clamping surface 24 in the first slot side 29. Pressure is supplied to the first slot side 29 before the second slot side 32 in this case in a different way from that of FIG. 3. The slot sides 29,32 are arranged in mirror symmetrical manner to the middle plane 30. The bolt axis 27 of the clamp bolt 26 is not located in the middle plane 30 of the clamping slot 31 and is instead displaced towards the first slot side 29, but the action obtained is the same.

Although the placing of the clamping element (locking screw or clamp bolt) on the second groove side 9 or the second slot side 32 has the consequence of a clear resistance to further prestressing, in certain circumstances it can occur that as a result of the small bearing surface plastic deformations occur on the second side and reduce the limiting or bounding effect. In order to prevent such deformations, it can be advantageous in accordance with FIG. 4c to provide on the second side, in this case the second slot side 32, a stop face 33 with a corresponding workhardening zone 34, which is produced in the same way, namely by cold extrusion prior to hardening, as the clamping surface 24. Both the surfaces 24 and 34 can e.g. be simultaneously produced in that prior to hardening and using a bolt comparable to the clamp bolt and whose axis is located in the middle plane 30, pressing occurs in the clamping slot. Here again it is obvious that the two surfaces 24 and 34 according to FIG. 4 can be advantageously used in the embodiment of FIG. 3.

The hitherto considered clamping element 16 (FIG. 2b), apart from the axial force component also produces a radial force component, which leads to a one-sided loading of the coupling perpendicular to the coupling axis 11. To reduce or completely prevent such a one-sided loading, according to another embodiment of the invention several clamping elements can be used, which are spaced from one another by an angular distance around the coupling axis 11. Various, non-exhaustive examples of such arrangements are shown in FIGS. 5a to c in a manner corresponding to FIG. 2b. In the case of FIG. 5a two clamping elements 16a, 16b are arranged perpendicular to one another, whereas in FIG. 5b two clamping elements 16a, 16b diametrically face one another. Finally, in FIG. 5c there are in all three clamping elements 16a–c, which are in each case mutually turned by 120°.

Figure 6:
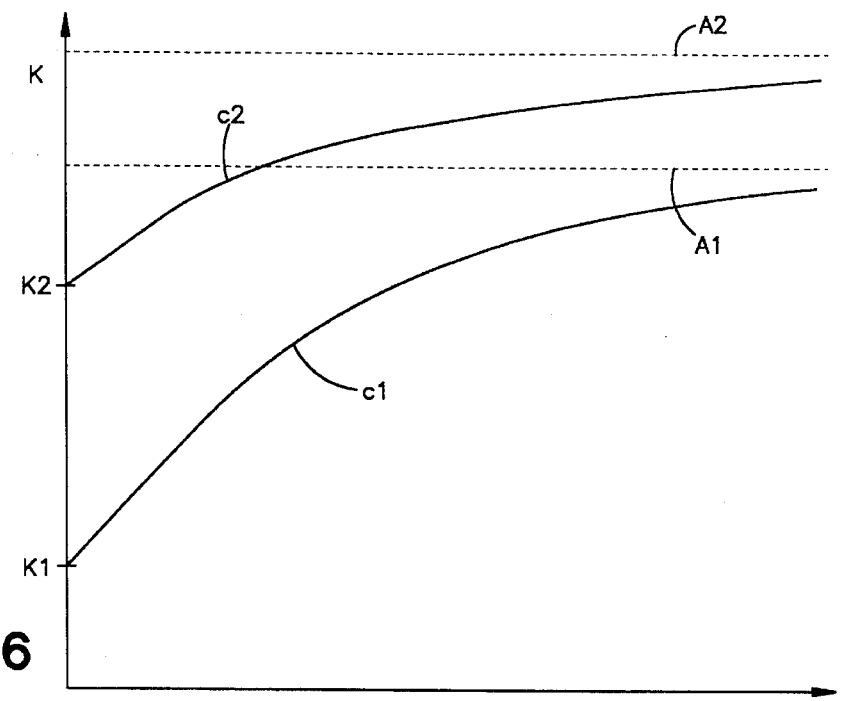
FIG. 6 a diagram of the clamping force K which can be produced over the number of load reversals $N_{LW}$ in the case of conventional couplings (curve c1) and with couplings according to the invention (curve c2).

It is vital in all cases that prior to hardening the geometrically true impression 24 with the underlying workhardening zone 25 is produced by plastic deformation in the clamping surface. The resulting improvement is made clear by the diagram of FIG. 6 which, in comparative manner, shows the attainable clamping force K as a function of the load reversal number $N_{LW}$ for a conventional coupling without impression (curve c1) and a coupling with impression according to the invention (curve c2). In the case of the conventional coupling the attainable clamping force starts at a relatively low value K1, because there are strong plastic deformations in the clamping surface. Only with an increasing load reversal number (clamping-unclamping) does a workhardening occur, which leads to a hardening of the clamping surface and to an asymptotic approach to a final or end value A1.

With the coupling according to the invention the clamping force starts with a starting value higher by a factor of more than 2 and with the load reversal number approaches in a much flatter curve and in asymptotic manner a much higher end or final value A2.

In the embodiment shown in FIGS. 1 and 2 there is only a single clamping element 16 and a single clamping surface 24, so that both coupling parts 1 and 2 can only be positioned in a single mutual position for clamping purposes. This position is e.g. ensured by a positioning aid comprising a pin 35 and a blind hole 36. In the rough, everyday use of the coupling such a singular positioning possibility can prove cumbersome and not very flexible. To bring about an improvement here, according to a further development of the invention for a clamping element is provided a plurality of similar clamping surfaces arranged in rotationally symmetrical manner about the coupling axis. For the relative positioning of the coupling parts there are then positioning means, so that selectively one of the clamping surfaces faces the clamping element in the position suitable for clamping.

Figures 7A, 7B:
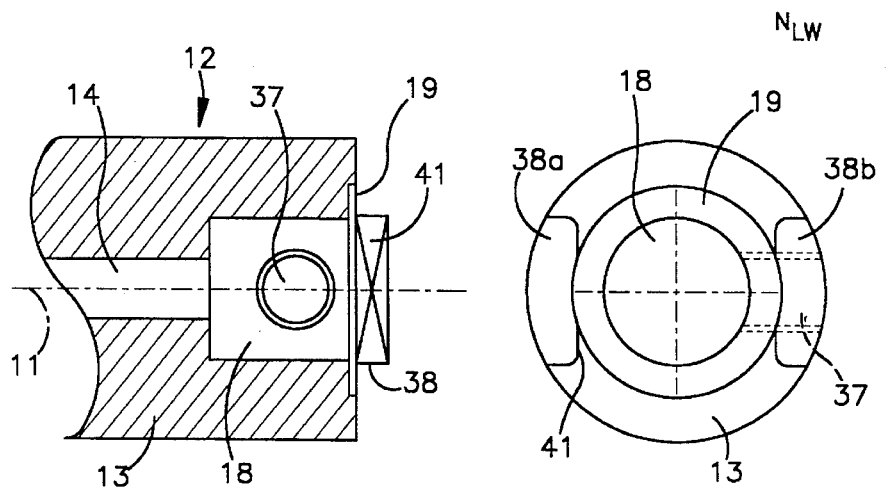
FIG. 7 in longitudinal section (a) and in front view (b) a second coupling part with a positioning aid.
Figures 8A, 8B:
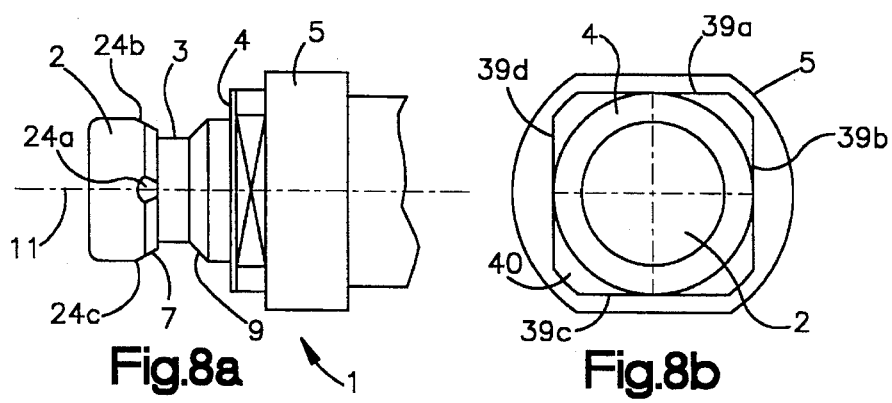
FIG. 8 in side view (a) and in front view (b) the first coupling part belonging to FIG. 7 with a plurality of clamping surfaces and a polygon as the positioning aid.

A preferred embodiment of such a coupling with a multiple (four-fold) positioning possibility is shown in FIGS. 7 and 8. The second coupling part 12 shown in longitudinal section (a) and in front view (b) in FIG. 7 has the following changes compared with FIG. 2. The diameter of the second contact surface 19 is reduced and is lowered relative to the end face of the reception body 13. Therefore the second contact surface 19 is better protected against mechanical damage. In addition, on the reception body 13 there are two positioning flaps 38a, b, which are milled out and project from the end face in the direction of the coupling axis 11 and which in each case have an inner surface 41 suitable for positioning purposes and parallel to the coupling axis 11. The two positioning flaps 38a, b diametrically face one another. The first positioning flap diametrically faces the locking screw thread 37 provided for the locking screw 22, i.e. the clamping element.

In the first coupling part 1 shown in side view (a) and front view (b) in FIG. 8 the first contact surface 4 has a reduced diameter corresponding to the second contact surface 19. Below the first contact surface 4 a square 40 is worked out of the central part 5 of the coupling part 1. The square 40 is laterally bounded by four positioning surfaces 39a–d, which are pairwise at right angles to one another and can in each case be passed into one another by a 90° rotation. With each of the positioning faces 39a–d is associated a clamping surface 24a–c on the clamping trunnion 2. The association is chosen in such a way that one of the clamping surfaces 24a–c always comes to rest in a position suitable for clamping below the clamping element, if the corresponding clamping surface engages on the inner surface of the positioning flap. In this way it is possible to obtain four equivalent positioning possibilities, the positioning flaps 38a, b, in conjunction with the square 40, facilitating the correct positioning on introduction. It is obviously also conceivable in place of the 4-fold rotational symmetry shown, to use another rotational symmetry in order to increase the number of positioning possibilities.

It is finally expressly pointed out once again that a coupling according to the invention is not only suitable for the transmission of dynamic forces, such as e.g. occur with tools driven by machines, but can also be used for static forces, e.g. for the detachable connection of the elements of a framework, skeleton structure, etc.

| List of reference numerals | |
| --- | --- |
| 1,12 | Coupling part |
| 2 | Clamping trunnion |
| 3 | Clamping groove |
| 4,19 | Contact surface |
| 5 | Central part |
| 6 | Through bore |
| 7,9 | Groove side |
| 8 | Middle plane (clamping groove) |
| 10 | Threaded connection |
| 11 | Coupling axis |
| 13 | Reception body |
| 14 | Connecting bore |
| 15 | Clamping element axis |
| 16,16a–c | Clamping element |
| 17 | Tapped hole |
| 18 | Reception bore |
| 20 | Hexagonal recess |
| 21 | Screw axis |
| 22 | Locking screw |
| 23 | Screw end (conical) |
| 24 | Clamping surface |
| 25,34 | Workhardening zone |
| 26 | Clamp bolt |
| 27 | Bolt axis |
| 28 | Bolt end (conical) |
| 29,32 | Slot side |
| 30 | Middle plane (clamping slot) |
| 31 | Clamping slot |
| 33 | Stop face |
| 35 | Pin |
| 36 | Blind hole |
| 37 | Locking screw thread |
| 38,38a,b | Positioning flaps |
| 39a–d | Positioning surface |
| 40 | Square |
| 41 | Inner surface |

-continued

List of reference numerals

| | |
|---|---|
| a | Clamping path |
| A1,A2 | End value (asymptotic) |
| c1,c2 | Curve |
| K | Clamping force |
| K1,K2 | Initial value (clamping force) |
| $N_{LW}$ | Load reversal number |

I claim:

1. Coupling, particularly for joining a tool to a driving unit, comprising:
   (a) two coupling parts (1, 12) successively arranged in a coupling axis (11) and which have two facing contact surfaces (4 or 19) at right angles to the coupling axis (11),
   (b) within the first coupling part (1) a clamping trunnion (2) projecting from the first contact surface (4) and substantially rotationally symmetrical to the coupling axis (11),
   (c) within the second coupling part (12) a reception bore (18) for receiving the clamping trunnion (2) and which emanates from the second contact surface (19) and is located in the coupling axis (11) in such a way that the two contact surfaces (4 or 19) engage on one another when the clamping trunnion (2) is completely inserted in the reception bore (18) and
   (d) a clamping device with a least one cylindrical clamping element (16), which with a conically tapering end in the vicinity of the reception bore (18) and along a clamping axis (21) transversely to the coupling axis (11) acts through the reception body (13) on a clamping surface (24) on the clamping trunnion (2) and inclined with respect to the coupling axis (11) and produces a clamping force acting in the direction of the coupling axis (11), wherein
   (e) at least the clamping trunnion (2) is made from a surface-hardened material, preferably steel,
   (f) the clamping surface (24) is geometrically true with respect to the surface of the conical clamping element, and
   (g) the clamping surface (24) is produced by cold extrusion prior to hardening by pressing a body with a conically tapering end similar to said conically tapered end of said clamping element (16) along said clamping axis (21) against said clamping trunnion (2) to make an indentation into said clamping trunnion (2), the boundary of said indentation being formed by said clamping surface.

2. Coupling according to claim 1, wherein
   (a) the clamping trunnion (2) is provided with an all-round clamping groove (3), which is laterally bounded on the side further removed from the first contact surface (4) by a first, inclined groove side (7) and
   (b) the clamping surface (24) is located on the first groove side (7).

3. Coupling according to claim 1, wherein
   (a) the clamping trunnion (2) is provided with a planar clamping slot (31) running transversely to the coupling axis and which is laterally bounded on the side further removed from the first contact surface (4) by a first, inclined slot side (29) and
   (b) the clamping surface (24) is located on the first slot side (29).

4. Coupling according to claim 1, wherein the clamping path (a) which can be covered by the clamping element (16) during clamping is limited by a stop.

5. Coupling according to claim 4, wherein
   (a) the clamping trunnion (2) is provided with an all-round clamping groove (3), which is laterally bounded by two inclined groove sides (7 or 9),
   (b) the clamping surface (24) is located on the first groove side (7) further removed from the first contact surface (4) and
   (c) the second groove side (9) serves as a stop for the clamping element (16).

6. Coupling according to claim 4, wherein
   (a) the clamping trunnion (2) is provided with a planar clamping slot (31) running transversely to the coupling axis and which is laterally bounded by two inclined slot sides (29 or 32),
   (b) the clamping surface (24) is located on the first slot side (29) further removed from the first contact surface (4) and
   (c) the second slot side (32) serves as a stop for the clamping element (16).

7. Coupling according to claim 6, wherein
   (a) the clamping groove (3) or the clamping slot (31) is constructed symmetrically to a middle plane (8 or 30) and
   (b) the clamping groove (3) or the clamping slot (31) is positioned relatively to the clamping element (16) in such a way that during clamping the clamping element (16) with its clamping element axis (15) is located in the direction towards the first groove side (7) or slot side (29) outside the middle plane (8 or 30).

8. Coupling according to claim 7, wherein the second groove side (9) or slot side (32) has a stop face (33) which is mirror symmetrical to the clamping surface with respect to the middle plane (8 or 30) and which is also produced prior to hardening by cold extrusion and serves as a stop for the clamping element (16).

9. Coupling according to claim 6, wherein
   (a) the clamping groove (3) or clamping slot (31) have a middle plane (8 or 30),
   (b) in the assembled state of the coupling the clamping element (16) with its clamping element axis (15) is approximately located in the middle plane (8) of the clamping groove (3) and
   (c) the first groove side (7) or slot side (29) is radially outwardly displaced relative to the second groove side (9) or slot side (32).

10. Coupling according to claim 1, wherein the clamping element (16) is constituted by a locking screw (22), particularly with a hexagonal recess (20).

11. Coupling according to claim 1, wherein the clamping element (16) is constituted by a lock bolt (26).

12. Coupling according to claim 1, wherein a plurality of clamping elements (16a–c) is used, which are arranged with an angular spacing around the coupling axis (11).

13. Coupling according to claim 12, wherein use is made of two clamping elements (16a, 16b) mutually turned by 90°.

14. Coupling according to claim 12, wherein there are two clamping elements (16a, 16b) mutually turned by 180°.

15. Coupling according to claim 12, wherein there are three clamping elements (16a–c) mutually turned by in each case 120°.

16. Coupling according to claim 1, wherein for the at least one clamping element (16) is provided a plurality of similar clamping surfaces (24a–c) arranged in rotationally symmetrical manner about the coupling axis (11) and wherein means are provided for positioning the coupling parts (1,12) relative to one another in such a way that selectively one of the clamping surfaces (24a–c) faces the clamping element (16) in the position suitable for clamping.

17. Coupling according to claim 16, wherein the positioning means on the second coupling part (12) comprise at least one positioning flap (38,38a,b) extending in the direction of the coupling axis (11) and fitted outside the second contact surface (9) and having an inner surface (41) parallel to the coupling axis (11), as well as on the first coupling part (1) a polygon rotationally symmetrical about the coupling axis (11) and constructed below the first contact surface (4), said polygon being laterally bounded by a plurality of positioning surfaces (39a–d) corresponding to the plurality of clamping surfaces (24a–c), each of the positioning surfaces (39a–d) being associated with a clamping surface (24a–c) and comes to rest on the inner surface (41) of the positioning flap (38,38a,b), if the associated clamping surface is used for clamping.

18. Coupling according to claim 17, wherein there are four equivalent clamping surfaces (24a–c) turned with respect to one another by 90° and wherein the polygon is constructed as a square (40).

19. A coupling for joining a tool to a driving unit comprising:

- a first coupling part centered on a coupling axis and having a first contact surface which extends perpendicular to said coupling axis;
- a second coupling part arranged successively with said first coupling part on said coupling axis, said second coupling part having a second contact surface which extends perpendicular to said coupling axis and which faces said first contact surface of said first coupling part;
- said first coupling part having a clamping trunnion which projects from said first contact surface and which is substantially rotationally symmetrical to said coupling axis, said clamping trunnion having at least one clamping surface which is inclined with respect to said coupling axis;
- said second coupling part having a reception bore for receiving said clamping trunnion, said reception bore emanating from said second contact surface, said reception bore being disposed about said coupling axis, said clamping trunnion being inserted completely into said reception bore, said first and second contact surfaces engaging one another;
- said second coupling part further having at least one radial opening extending from said reception bore to the outside of said second coupling part, said at least one radial opening being located in a clamping plane which is parallel to said first and second contact surfaces; and
- at least one cylindrical clamping element lying in said clamping plane and having a conically tapering end, said at least one clamping element being located in said at least one radial opening in said second coupling part, said at least one clamping element engaging said at least one clamping surface to produce a clamping force in the direction of said coupling axis urging said first and second contact surfaces together;
- said at least one clamping surface of said clamping trunnion having an indentation corresponding in shape to the shape of a portion of said conically tapering end of said clamping element;
- said indentation being located in a work hardened zone of the material of said clamping trunnion and being defined by a hardened surface of said work hardened zone.

* * * * *